United States Patent [19]

Miyamoto et al.

[11] Patent Number: 4,894,820
[45] Date of Patent: Jan. 16, 1990

[54] DOUBLE-TALK DETECTION IN AN ECHO CANCELLER

[75] Inventors: Ryoichi Miyamoto; Yoshio Itoh; Yoshikazu Nakano; Mitsuo Tsujikado; Kenichiro Hosoda, all of Tokyo, Japan

[73] Assignee: Oki Electric Industry Co., Ltd., Tokyo, Japan

[21] Appl. No.: 171,487

[22] Filed: Mar. 21, 1988

[30] Foreign Application Priority Data

Mar. 24, 1987 [JP] Japan .................................. 62-69589
Mar. 26, 1987 [JP] Japan .................................. 62-72748
Jun. 30, 1987 [JP] Japan .................................. 62-163654

[51] Int. Cl.$^4$ .............................................. H04B 3/23
[52] U.S. Cl. ..................................... 370/32.1; 379/410
[58] Field of Search ............... 379/388, 389, 390, 406, 379/407, 410, 411; 370/32, 32.1; 341/75

[56] References Cited

U.S. PATENT DOCUMENTS

| | | | |
|---|---|---|---|
| 3,499,999 | 3/1970 | Sondhi | 379/411 X |
| 3,699,271 | 10/1972 | Berkley et al. | |
| 4,426,729 | 1/1984 | Gritton | 381/41 |
| 4,626,825 | 12/1986 | Burleson et al. | 341/75 |
| 4,712,235 | 12/1987 | Jones, Jr. | 379/410 |

FOREIGN PATENT DOCUMENTS

| | | |
|---|---|---|
| 0053202 | 6/1982 | European Pat. Off. . |
| 0182096 | 5/1986 | European Pat. Off. . |
| 219837 | 12/1983 | Japan . |
| 56526 | 3/1986 | Japan . |
| 2075313 | 11/1981 | United Kingdom . |

OTHER PUBLICATIONS

Hayashi et al., "Echo Canceller With Double Talk Controller", 1983, IEEE, Global com. 1983, Session 40.6, pp. 1389-1393.
"Applications of Digital Signal Processing", IECE of Japan, Third Edition, Jul. 10th, 1983, pp. 212-221.

*Primary Examiner*—Jin F. Ng
*Assistant Examiner*—Randall S. Vaas
*Attorney, Agent, or Firm*—Spencer & Frank

[57] ABSTRACT

In a method and apparatus for double-talk detection in an echo canceller that uses an adaptive digital filter to estimate, from a received signal and a transmitted signal to which an echo signal of the received signal is added, the characteristics of an echo path and generate a simulated echo signal, and subtracts this echo replica from the transmitted signal in order to transmit a residual signal from which the echo signal has been removed, and which during the course of this operation detects the double-talk state according to a double-talk detection threshold and inhibits the estimation of adaptive digital filter; adaptive estimation and the double-talk detection threshold are controlled in accordance with the state of system e.g., whether it is in the single-talk state, whether the echo signal is active or idle, whether there are fluctuations in the echo path, or whether howling is taking place.

4 Claims, 15 Drawing Sheets

FIG. 16

| INTERVAL | INPUT SIGNAL \|x(k)\| | PARAMETER a | PARAMETER b | LOGARITHM VALUE Lx(k) |
|---|---|---|---|---|
| 1 | 0 ≦ ~ < 2 | 6 | -6 | -6 ~ 6 |
| 2 | 2 ~ 8 | 2 | 2 | 6 ~ 18 |
| 3 | 8 ~ 32 | $2^{-1}$ | 14 | 18 ~ 30 |
| 4 | 32 ~ 128 | $2^{-3}$ | 26 | 30 ~ 42 |
| 5 | 128 ~ 512 | $2^{-5}$ | 38 | 42 ~ 54 |
| 6 | 512 ~ 2048 | $2^{-7}$ | 50 | 54 ~ 66 |
| 7 | 2048 ~ 8192 | $2^{-9}$ | 62 | 66 ~ 78 |
| 8 | 8192 ~ 32768 | $2^{-11}$ | 74 | 78 ~ 90 |

DOUBLE-TALK DETECTION IN AN ECHO CANCELLER

BACKGROUND OF THE INVENTION

This invention relates to a double-talk detection method and apparatus employed in an echo canceller that cancels echo signals that would degrade speech quality in, for example, satellite communications and speaker-equipped telephones or hands-free telephones, and that takes special action when double-talk (simultaneous transmission in both directions) occurs.

The prior art in this field has been described in (1) Dijitaru Shingo Shori no Oyo (Applications of Digital Signal Processing), IECE of Japan, 3rd edition (July 10, 1983), pp. 212–221, (2) Japanese Patent Application Laid-Open 1983/219837, and (3) Japanese Patent Application Laid-Open 1986/56526, and will be explained with reference to the drawings.

FIG. 1 is a block diagram of a prior art echo canceller as described in references (1) and (2).

In long-distance telephone circuits, for reasons of line economics and easy replaceability, the two-wire configuration is generally adopted for the subscriber line 1 connected to the subscriber's telephone set, the two-wire configuration being a configuration in which a single wire carries signals in both directions. On the long-distance line 2 to which the subscriber line is connected, however, the four-wire configuration which provides separate paths for each direction is adopted, because of the need for amplifiers to compensate for line loss. To convert between the two-wire and four-wire configurations a hybrid coil 3 is connected at each conversion point, the impedance $Z_L$ of the hybrid coil 3 being matched to the impedance of the subscriber line 1. Subscriber lines differ, however, in type and length; consequently, each subscriber line 1 has its own peculiar impedance and it is difficult to match the impedance $Z_L$ of the hybrid coil 3 perfectly. As a result, the hybrid coil 3 not only passes the signal Rin from the distant party A received via the four-wire long-distance line 2 to the local party B via the subscriber line 1, but also acts as an echo path, allowing the signal Rin to leak over to the transmitting side, where it becomes an echo signal Sin that degrades speech quality. To cancel the echo signal Sin, an echo canceller 10 is connected at the two-wire/four-wire conversion point.

The echo canceller 10 comprises analog-to-digital (A/D) converters 11 and 12, digital-to-analog (D/A) converters 13 and 14, an adaptive digital filter (ADF) 15, a subtractor 16, and a double-talk detector 17.

When the signal Rin received from the distant party A enters the long-distance line 2, it is sampled by the A/D converter 11 to generate a discrete value at a time k and thus converted to a digital received signal Rin(k). The digital received signal Rin(k) is converted by the D/A converter 13 to an analog received signal Rout and sent via the hybrid coil 3 and the subscriber line 1 to the local party B, but if the impedances are not matched, part of the analog received signal Rout follows the echo path C and reaches the transmitting side as the echo signal Sin. The echo signal Sin is sampled by the A/D converter 12 at a time k to generate a discrete value at the time k and is thus converted to a digital echo signal Sin(k) which is fed to the subtractor 16.

The ADF 15 estimates the characteristics of the echo path C and from the estimated characteristics and the digital received signal Rin(k) generates a simulated echo signal $\hat{S}in(k)$ which it feeds to the subtractor 16. The subtractor 16 subtracts the simulated echo signal or echo replica signal $\hat{S}in(k)$ from the digital echo signal Sin(k) and generates the difference as a residual signal Res(k). The ADF 15 cancels the echo signal Sin so as to force this residual signal Res(k) to converge to zero.

The adaptive estimation function of the ADF 15 operates normally in the single-talk state in which only the received signal Rin is present, but in the double-talk state in which there is also a transmitted signal N from the local party B, the estimation function of the ADF 15 is apt to be subverted. A double-talk detector 17 therefore compares the level (average voltage, average power, peak voltage, or peak power, for example) of the residual signal Res(k) with a fixed, internally preset double-talk detection threshold, and outputs an inhibit signal INH to inhibit the estimation function of the ADF 15 when the level of the residual signal Res(k) exceeds the double-talk detection threshold. The only operation performed by the ADF 15 is then to generate the simulated echo signal $\hat{S}in(k)$. Thus, the signal N transmitted by the local party B and the echo signal Sin are converted by the A/D converter 12 to a digital signal Sin(k)+N(k), but after the subtractor 16 subtracts the simulated echo signal $\hat{S}in(k)$ to cancel the echo signal Sin(k) the residual signal Res(k) consists only of the local party B's transmit signal N(k), which is converted to an analog signal by the D/A converter 14 and sent as the transmitted signal Res to the distant party A.

The double-talk detection threshold in this type of double-talk detector 17 is fixed. Accordingly, depending on the value at which the threshold is fixed, this method of controlling the detection of double-talk is likely to inhibit the estimation unnecessarily, due for example to fluctuations on the echo path C, with attendant reduction in the accuracy of double-talk detection. To solve this problem, reference (3) describes a method of changing the double-talk detection threshold.

The prior art method of double-talk detection described in reference (3) is to observe the ratio of the levels of the residual signal Res(k) and the received signal Rin(k):

$$X = -\log[(\text{level of Res}(k))/(\text{level of Rin}(k))]$$

Double-talk is detected when $-X$ exceeds the double-talk detection threshold $-Vt$, and the double-talk detection threshold $-Vt(k)$ at the sampling point k is adjusted by formula (a) or (b) below according to the double-talk detection result.

(a) When double-talk is detected

The adaptation function of the ADF is inhibited, a switch is operated to select a preset correction value $-\delta u$ ($\delta u > 0$), and $Vt(k)$ is decreased by the correction amount $-\delta u$:

$$Vt(k+1) = Vt(k) - \delta u \tag{101}$$

This raises the threshold value Vt, making double-talk harder to detect.

(b) When the received signal is active and double-talk is not detected.

The inhibition of the adaptation operation of the ADF is removed, a switch is operated to select a preset correction value $+\delta D$ ($\delta D > 0$), and $Vt(k)$ is increased by the correction amount $+\delta D$:

$$Vt(k+1) = Vt(k) + \delta D \tag{102}$$

This lowers the threshold value Vt, making double-talk easier to detect.

The adjustment performed in equations (101) and (102) improves both detection speed and detection accuracy.

The method described in reference (3), however, has the following problems:

(i) When the received signal is active and double-talk is not detected, since the threshold $-V_t$ is expressed by a monotonically increasing formula in equation (102), double-talk detection sensitivity is low during the initial convergence process of the ADF 15.

(ii) When the switch selects the $-\delta u$ correction the ADF 15 is always inhibited, so unnecessary inhibition occurs due to factors such as momentary power fluctuations and loud speech. Accordingly, the echo canceller 10 does not perform well in tracking an echo path that is subject to constant minor fluctuations.

(iii) The corrections $\delta u$ and $\delta D$ in equations (101) and (102) are set empirically, so depending on the statistical properties of the received signal Rin, the appropriate threshold $-V_t$ may not be obtained, in which case the sensitivity of threshold detection may be degraded.

A further problem of this prior art is explained with reference to FIG. 2 and FIG. 3 in connection with a hands-free telephone.

FIG. 2 is a block diagram showing the configuration of this prior art echo canceller shown in the reference (3). Reference numeral 800 in FIG. 2 denotes the echo canceller, and 802 denotes the hands-free telephone. In this apparatus, the echo canceller 800 cancels the leakage of the echo signal Sin(k) into the transmitted signal, which occurs when the voice signal Rout produced from the speaker 804 follows an acoustic path (called an echo path or EP) within the room and enters the microphone 806. Reference numeral 808 denotes a speaker amplifier, and 810 denotes a microphone amplifier.

The echo canceller 800 comprises an adaptive digital filter (ADF) 812 for generating a simulated echo signal Ŝin(k), a double-talk detector (DTD) 814 for controlling the adaptive estimation function performed by the ADF 812, and an adder 816 for subtracting the simulated echo signal Ŝin(k) from the echo signal Sin(k) to generate a residual signal Res(k). The numerals 818 and 820 denote A/D converters, 822 and 824 denote D/A converters, and k is a sampling point which is synchronized with, for example, an 8 kHz synchronizing clock pulse.

The technology disclosed in the reference (3) raised the detection sensitivity of the double-talk detector 814. FIG. 3 is a block diagram of this prior art double-talk detector. In this configuration, reference numerals 901 to 903 and 923 denote peak value detectors, 904 to 906 are squaring circuits, 907 and 908 are priority encoders, 909 is an AT memory, 910, 918, 924, and 925 are adders, 911, 912, and 916 are comparators, 913, 914, and 917 are switches, 915 is a shift circuit, 919 and 920 are limiters, and 921 and 922 are correction memories. Detailed descriptions of these elements are omitted, but in this configuration the peak detectors 901, 902, and 903 detect the peak values of the received signal Rin(k), the echo signal Sin(k), and the residual signal Res(k) (which are denoted x(k), y(k), and e(k) in FIG. 3); then the squaring circuits 904, 905, and 906 determine their peak power levels. The priority encoders 907 and 908 find the values of the signal levels Lx(k) and Le(k) of the received signal x(k) and the residual signal e(k). If the comparator 912 determines that the difference between the received signal level Lx(k) and the threshold value AT(k) exceeds the signal level Le(k) of the residual signal, that is, if $$Lx(k) - AT(k) > Le(k)$$

then the non-double-talk state is detected and a 0 output is generated for the ADF adaptive function inhibit signal INH. If, however, $$Lx(k) - AT(k) \leq Le(k)$$

then the double-talk state is detected and a 1 output is generated for the ADF adaptive function inhibit signal INH. In this way, the adaptive function performed by the ADF is controlled. The threshold value AT is controlled according to the double-talk detection result as follows:

(1) In the non-double-talk state (INH=0)

$$AT(k+1) = AT(k) + \delta D$$

(2) In the double-talk state (INH=1)

$$AT(k+1) = AT(k) - \delta D$$

A feature of this system is that even when double-talk or a fluctuation on the echo path makes $$Lx(k) - AT(k) \leq Le(k)$$

and the adaptive function of the ADF 812 is inhibited, the threshold value AT(k) decreases with the passage of time until $$Lx(k) - AT(k) > Le(k)$$

at which point the ADF 812 once more begins its adaptive estimation function.

In a hands-free telephone with an echo canceller having this prior art configuration, if a sudden fluctuation on the echo path causes howling to occur, then:

$$Lx(k) - AT(k) \leq Le(k)$$

so the adaptive function of the ADF is inhibited and the howling continues until the steady decrease in the threshold value AT(k) establishes the condition:

$$Lx(k) - AT(k) > Le(k)$$

This was a serious defect: the howling sound could make conversation impossible between the local and distant parties.

SUMMARY OF THE INVENTION

An object of the present invention is to provide a method of and apparatus for double-talk detection in an echo canceller that solves the above problems, present in the prior art, of reduced sensitivity of double-talk detection and unnecessary inhibition of the estimation function.

Another object of the present invention is to eliminate the defect of the prior art, the defect being that howling caused by a sudden fluctuation on the echo path would continue throughout the interval in which the adaptive function of the ADF was inhibited, and provide a method of and apparatus for double-talk detection to realize an echo canceller with excellent speech quality.

According to one aspect of the invention, there is provided a method of and apparatus for double-talk detection in an echo canceller that uses an ADF to estimate, from the received signal and the transmitted signal to which the echo signal of the received signal is added, the characteristics of an echo path and generate a simulated echo signal, and subtracts this simulated echo signal from the transmitted signal in order to transmit a residual signal from which the echo signal has been removed, and which during the course of this operation detects the double-talk state according to a double-talk detection threshold and inhibits the estimation function of the ADF. The double-talk detection threshold is modified by the following control procedure.

A determination is made as to whether the received signal is active or idle. If it is idle, the ADF's estimation function is inhibited and the double-talk detection threshold is held constant. If the received signal is active, a determination is made as to whether the echo signal is active or idle. If the echo signal is idle, the functional inhibition of the ADF is cleared, and the double-talk detection threshold is rapidly reduced. If the echo signal is active, the difference in level between the received signal and residual signal are determined, a margin is added to the difference between them, and the result is compared with the double-talk detection threshold. If the former is less than the latter, the double-talk state is detected and the adaptive digital filter function is inhibited. If the former is greater than the latter, the single-talk state is detected and the inhibition of the adaptive digital filter function is cleared. The double-talk detection threshold is furthermore updated while the ADF is estimating, in accordance with integration of its past values, the received signal, and the residual signal.

In the method of and apparatus for controlling double-talk detection described above, the margin added to the difference in level between the received signal and the residual signal prevents the estimation function of the ADF from being inhibited by minor fluctuations on the echo path. Calculation of the threshold value by integration of the difference between the levels of the received signal and residual signal prevents the estimation function of the ADF from being inhibited unnecessarily. Detection of the idle state of the received signal and rapid reduction of the threshold suppresses inhibition of the ADF's function. These control measures enable detection accuracy to be improved and precise operations to be performed, thereby solving the problems stated earlier.

According to another aspect of the invention there are provided a method of double-talk detection characterized in that the double-talk detection threshold value is controlled so that:

(i) In the single-talk state, the long-term average value of the level difference between the received signal and the residual signal is used for double-talk detection.

(ii) In the double-talk state, or when fluctuations occur on the echo path but are insufficient to cause howling, and when the received signal is idle, the detection threshold is held or is gradually reduced.

(iii) When howling is detected, the detection threshold is reduced more quickly than in case (ii).

According to a further aspect of the invention, there is provided a double-talk detector characterized in that it comprises:

a signal level calculation circuit for calculating the signal levels of the received signal and the residual signal;

a comparator for comparing the level difference between the received signal and the residual signal with a double-talk detection threshold value and generating a signal to inhibit the adaptive estimation function;

a howling detector for detecting howling;

an idle detector for detecting the idle state of the received signal; and a double-talk detection threshold control circuit for receiving the level difference signal and controlling the double-talk detection threshold in response to the detection results from the idle detector, the comparator, and the howling detector so that the detection threshold is reduced more rapidly when howling occurs than in the double-talk state.

Preferably, the double-talk detector includes a second-order nonrecursive adaptive predictive filter for receiving the received signal, the echo signal or the residual signal, and that howling be detected by means of the second-order coefficient of the adaptive predictive filter, a predictive output control coefficient, and the received signal register power of an adaptive digital filter for output of a simulated echo signal.

In a double-talk detection method and apparatus described above, when howling does not occur, double-talk detection and control of the detection threshold value are performed; when howling occurs, the rate at which the double-talk detection threshold is decreased is made faster than during double-talk to quickly clear the inhibition of the adaptive estimation function of the ADF.

Thus when howling occurs, the ADF immediately performs adaptive estimation, in accordance with detection results, so the howling stops at once and speech quality is not impaired, while double-talk detection assures a level of speech quality equivalent to that of the prior art.

According to a further aspect of the invention there is provided a logarithm calculator, suitable for use in the double-talk detector described above, for determining the logarithm value of a digital signal, comprising at least an absolute-value circuit for determining the absolute value of the digital signal, an interval determiner for determining in which of a plurality of intervals the absolute value lies and generating an access signal according to this determination, a parameter memory for storing and outputting parameters depending on the result of said determination as indicated by the access signal, and a computation circuit for calculating the logarithm value from the parameters and the absolute value.

In a logarithm calculator described above, the absolute-value circuit determines the absolute value of the digital input signal $X(k)$, and the interval determiner determines the interval to which the absolute value belongs. The interval determiner generates an access signal corresponding to the result of this determination, and reads parameters from the parameter memory. The computation circuit calculates the logarithm value from these parameters and the absolute value. This arrangement enables the parameter memory to be small in size and the control circuit to be simple in configuration.

BRIEF DESCRIPTION OF THE DRAWINGS

FIG. 16 shows an example of the interval subdivision and parameter values.

DETAILED DESCRIPTION OF THE PREFERRED EMBODIMENTS

Figure 4:
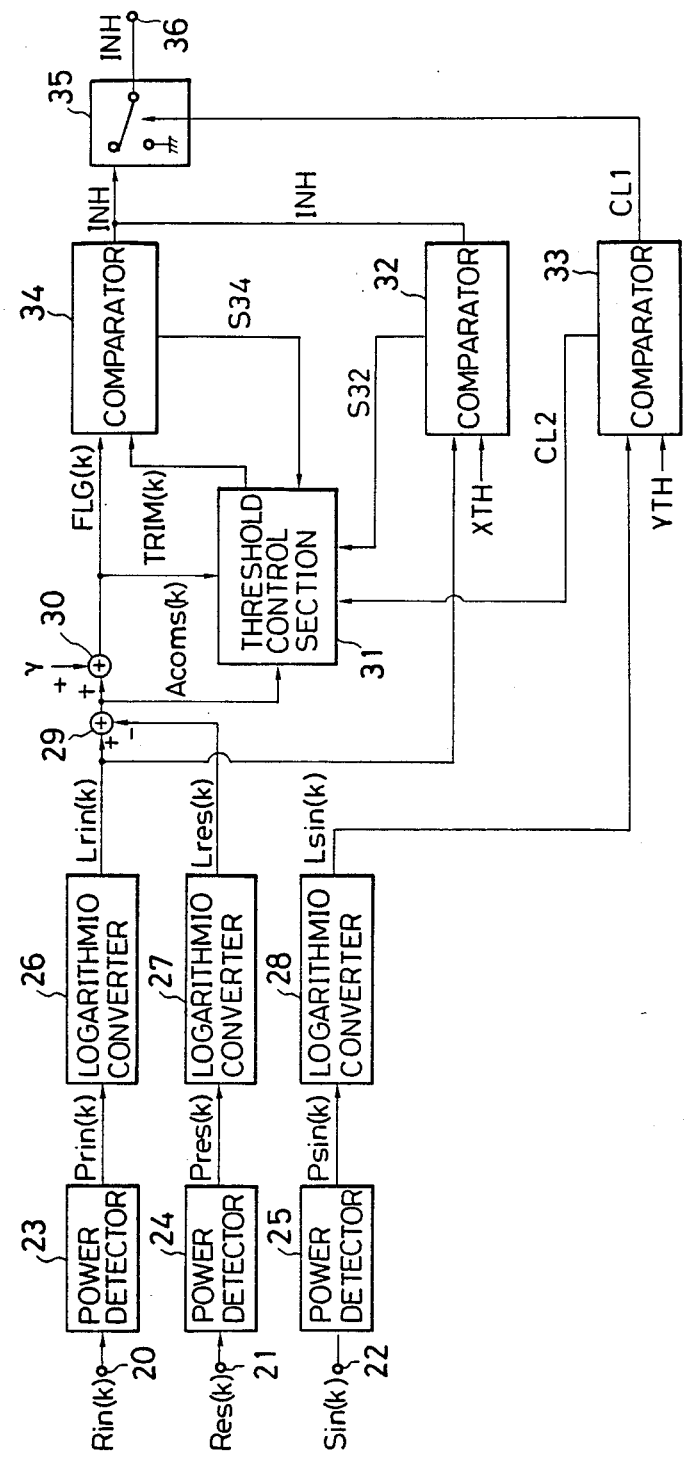
FIG. 4 is diagram of a double-talk detector used to explain a double-talk detection method employed in an embodiment of the present invention.

FIG. 4 is a block diagram of a double-talk detector employed in an embodiment of the present invention.

Figure 1:
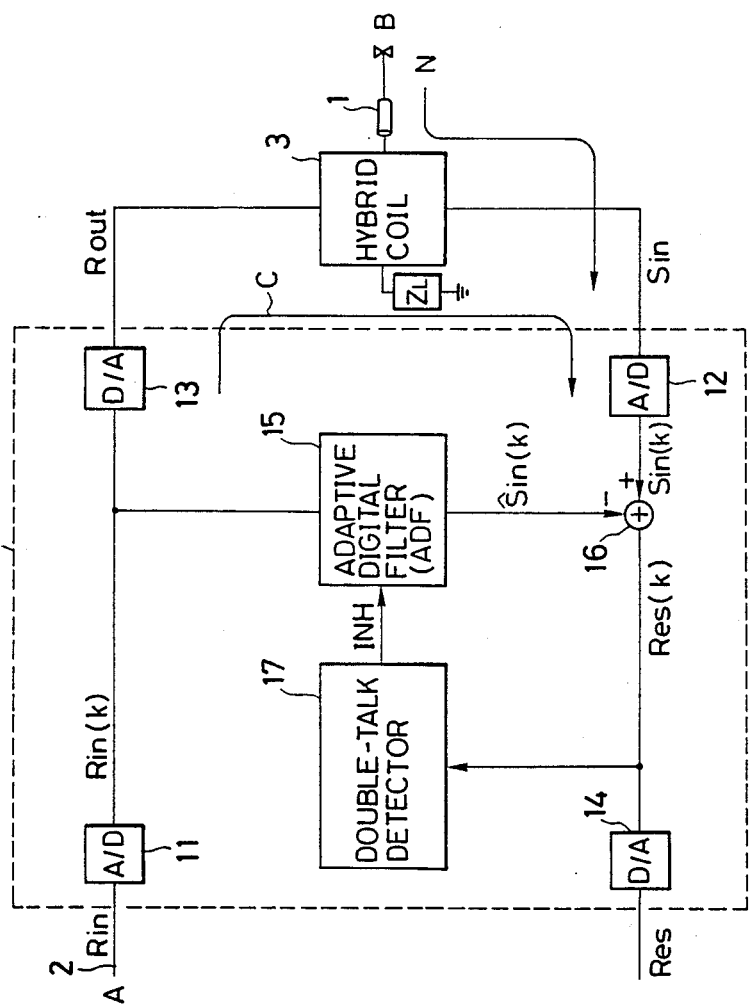
FIG. 1 is a block diagram for explanation of a prior art echo canceller.
Figure 2:
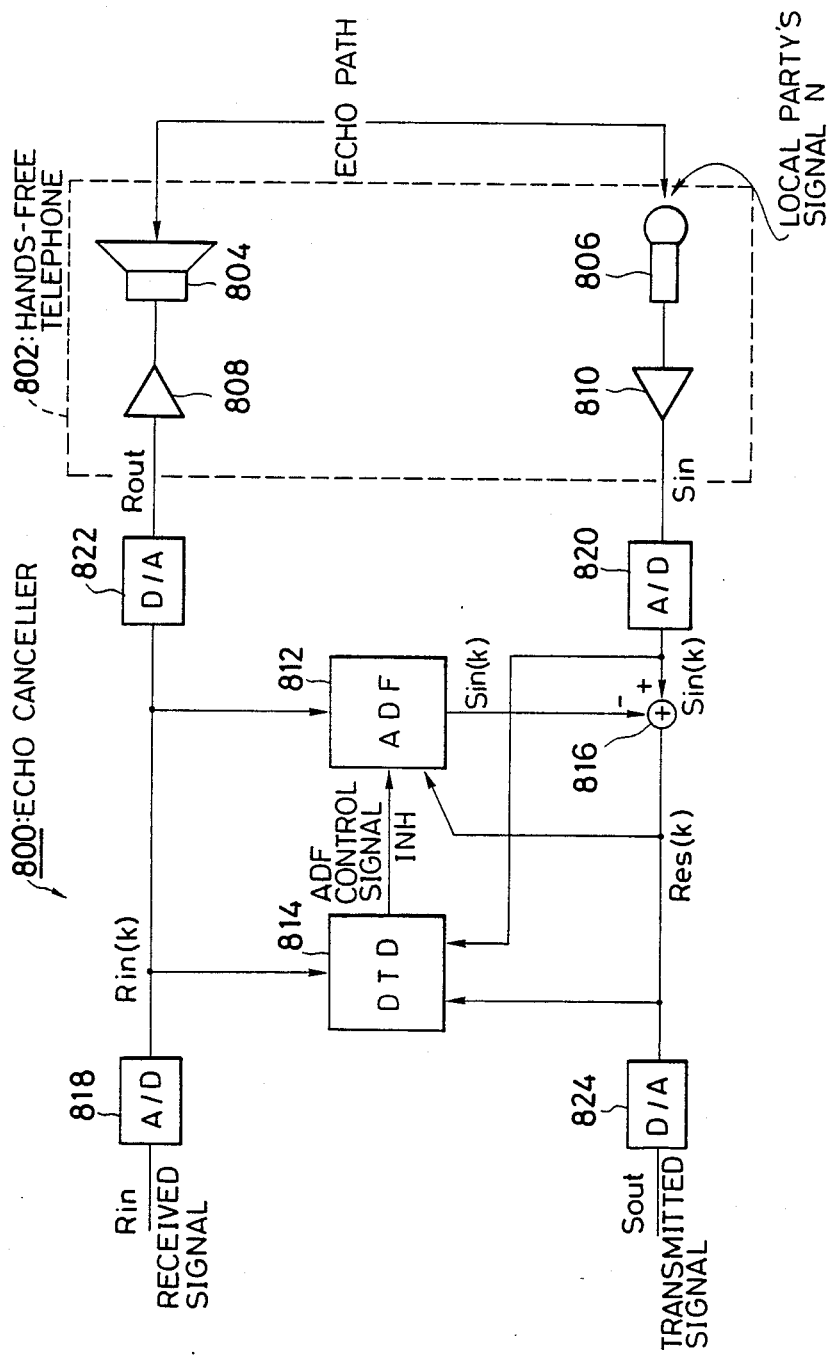
FIG. 2 is a block diagram of another example of a prior art echo canceller.
Figure 3:
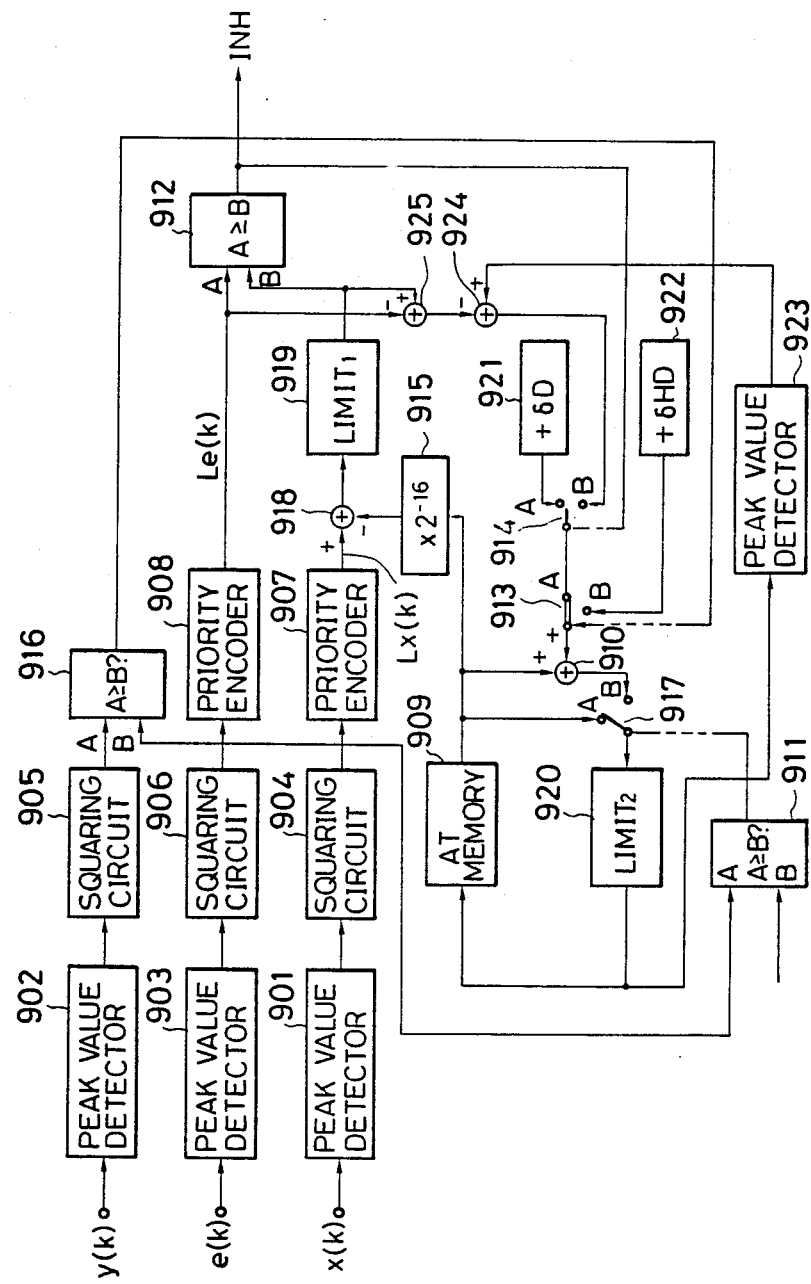
FIG. 3 is a block diagram of the configuration of the double-talk detector provided in the echo canceller in FIG. 2.

This double-talk detector is a circuit which can be used in the prior art echo canceller in FIG. 1. It comprises input terminals 20, 21, and 22 for the input of three digital signals: the received signal Rin(k), the residual signal Res(k), and the echo signal Sin(k). The input terminals 20, 21, and 22 are connected to three power detectors 23, 24, and 25, which are in turn connected to three logarithmic converters 26, 27, and 28. The power detectors are circuits that detect the power (average power, peak power, or some other power value) of the received signal Rin(k), the residual signal Res(k), and the echo signal Sin(k) and determine three signals Prin(k), Pres(k), and Psin(k). The logarithmic converters 26, 27, and 28 are circuits that convert the signals Prin(k), Pres(k), and Psin(k) to decibel level signals Lrin(k), Lres(k), and Lsin(k) in the logarithmic domain.

The outputs of the logarithmic converters 26 and 27 are connected to a subtractor 29, which is in turn connected to an adder 30 and a threshold control section 31. The subtractor 29 is a circuit that determines the difference in level between the signals Lrin(k) and Lres(k), and outputs a signal Acoms(k) to the adder 30 and the threshold control section 31. The adder 30 adds a margin value γ to the signal Acoms (k) to generate a signal FLG(k), and sends it to the threshold control section 31. The margin γ enables the ADF 15 to perform tracking even when minor fluctuations occurs on the echo path C in FIG. 1. The threshold control section 31 receives Acoms(k), FLG(k), and other signals and generates a variable double-talk detection threshold TRIM(k+1).

Comparators 32 and 33 are connected to the outputs of the logarithmic converters 26 and 28. The comparator 32 compares the signal Lrin(k) with a reference signal XTH, detects the idle state of the received signal Rin(k), and generates an estimation function inhibit signal INH and a control inhibit signal S32. Specifically, the comparator 32 detects when Lrin(k)<XTH, generates an inhibit signal INH with a logic value of "1" to inhibit updating by the estimation function of the ADF 15 in FIG. 1, and generates a control inhibit signal S32 to inhibit updating of the double-talk detection threshold TRIM(k+1) by the threshold control section 31, thus preventing the estimation function of the ADF 15 from being disrupted by idle noise (noise without speech) in the received signal Rin(k). The comparator 33 compares the signal Lsin(k) with a reference signal YTH, detects the idle state of the signal Sin(k) when Lsin(k)<YTH, generates a clear signal CL1 to clear the ADF estimation function inhibit signal INH to zero, and generates a clear signal CL2 to clear the double-talk detection threshold TRIM(k) output from the threshold control section 31 to a value such as zero. The function of the comparator 33 is thus to detect occurrences such as a fixed delay (the delay fixed irrespective of the frequency) on the echo path C or a switchover of the echo path due to, for instance, a momentary line interruption, and enable the estimation function of the ADF 15.

A comparator 34 is connected to the output of the adder 30, and the output of the comparator 34 is connected through an inhibit clear circuit 35 to the output terminal 36, which is connected to the ADF 15 in FIG. 1. The comparator 34 compares the threshold value TRIM(k) calculated by the threshold control section 31 at time (k−1) and the signal FLG(k) output by the adder 30: if TRIM(k)≧FLG(k), it detects the double-talk state and sets the inhibit signal INH to "1" to inhibit the ADF's estimation function; if TRIM(k)<FLG(k), it detects the single-talk state and sets the inhibit signal INH to "0". It also generates a control signal S34 that selects the method of control of the threshold value TRIM(k) according to the state recognized. The inhibit clear circuit 35 can be a switch which in the normal state permits the input inhibit signal INH to pass through to the output terminal 36, but when it receives the clear signal CL1 output from the comparator 33, switches over to ground and generates a "0" output as the inhibit signal INH.

Figure 5:
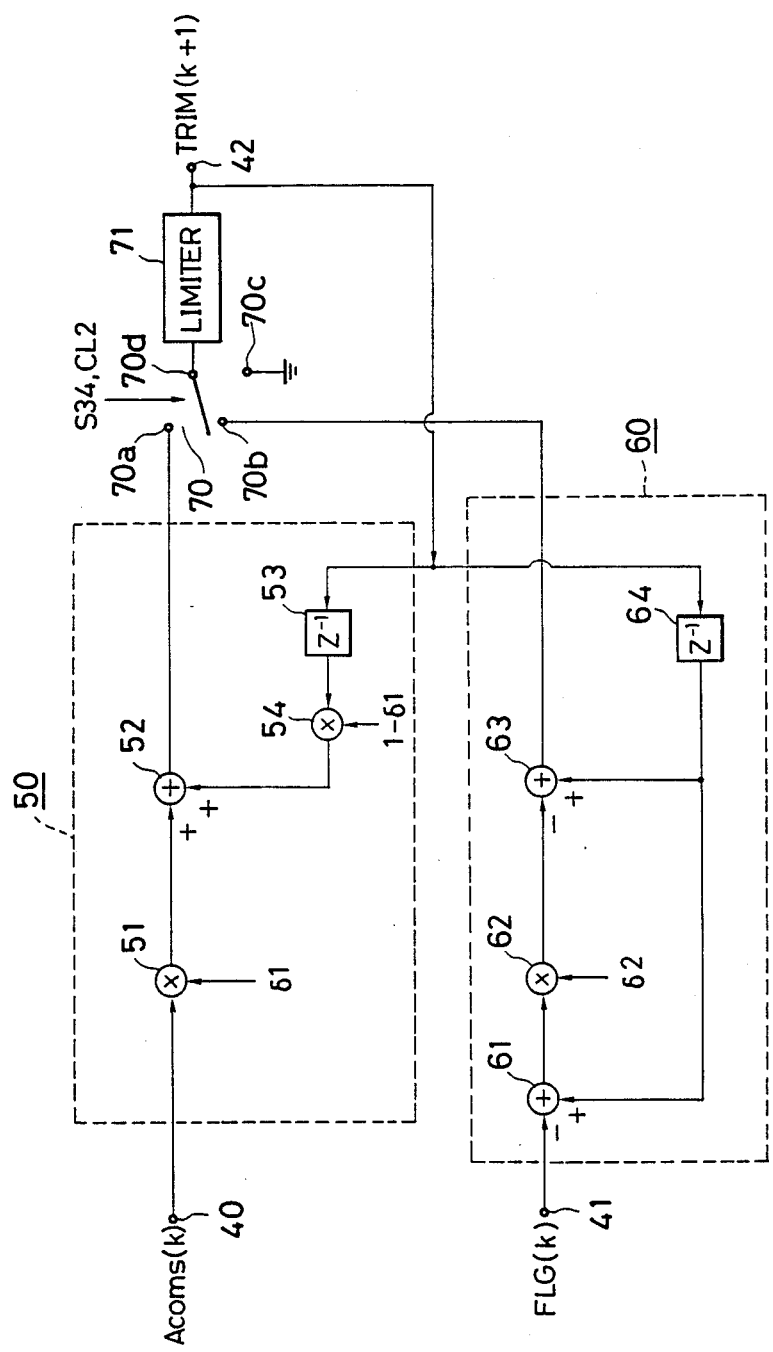
FIG. 5 is a schematic diagram of the threshold control section in FIG. 4.

FIG. 5 is a schematic diagram of the threshold control section 31 in FIG. 4. The threshold control section 31 comprises an input terminal 40 for receiving the signal Acoms(k), an input terminal 41 for receiving the signal FLG(k), and an output terminal 42 for output of the double-talk detection threshold TRIM(k), TRIM(k+1), .... The input terminals 40 and 41 are connected to the circuits 50 and 60 respectively, and the outputs of the circuits 50 and 60 are connected through a selector switch 70 and limiter 71 to the output terminal 42.

The one circuit 50, which intergrates the signal Acoms(k), comprises a multiplier 51 and an adder 52 connected in series to the input terminal 40. One input of the adder 52 is connected through a unit delay element 53 and a multiplier 54 to the output terminal 42. The multiplier 51 multiplies the signal Acoms(k) by a coefficient δ1 and sends the resulting product Acoms(k)·δ1 to the adder 52. The unit delay element 53 has a delay of $Z^{-1}$ and holds the past value TRIM(k) of the output TRIM(k+1) at the output terminal 42. The multiplier 54 multiplies the threshold TRIM(k) by a coefficient (1−δ1) and sends the resulting product TRIM(k)·(1−δ1) to the adder 52, which adds Acoms(k)·δ1 and TRIM(k)·(1−δ1). The other circuit 60 comprises a subtractor 61, a multiplier 62, and a subtractor 63 connected in series to the input terminal 41, with one input of the subtractor 63 connected through a unit delay element 64 to the output terminal 42. The unit delay element 64 has a transfer function of $Z^{-1}$ and holds the past value TRIM(k) of the output TRIM(k+1) at the output terminal 42. The subtractor 61 subtracts the signal FLG(k) from the threshold TRIM(k) to generate the difference TRIM(k)−FLG(k). The multiplier 62 multiplies the difference TRIM(k)−FLG(k) by a coefficient δ2 to generate the product (TRIM(k)−FLG(k))·δ2. The subtractor 63 subtracts the product (TRIM(k)−FLG(k))·δ2 from the threshold TRIM(k). The operations of the circuits 50 and 60 are halted by the control inhibit signal S32 from the comparator 32. The selector switch 70 connected to the outputs of the circuits 50 and 60 comprises a terminal 70a connected to the output of the adder 52, a terminal 70b connected to the output of the subtractor 63, a terminal 70c connected to ground, and a common terminal 70d connected to the input of the limiter 71. The selector switch selects the terminal 70a when the control signal S34 from the comparator 34 indicates the single-talk state, switches to the terminal 70b in the double-talk state, and switches to the terminal 70c in response to the clear signal CL2 from the comparator 33. The limiter 71 is a circuit that limits the maximum and minimum values of the threshold TRIM(k).

Figure 6:
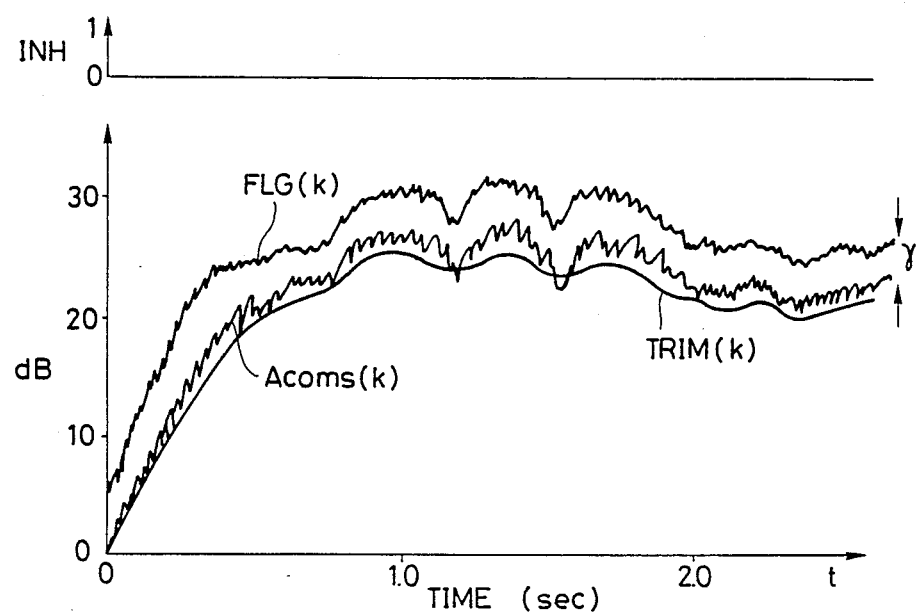
FIG. 6 illustrates signal waveforms occurring in FIG. 4, in the single-talk state.
Figure 7:
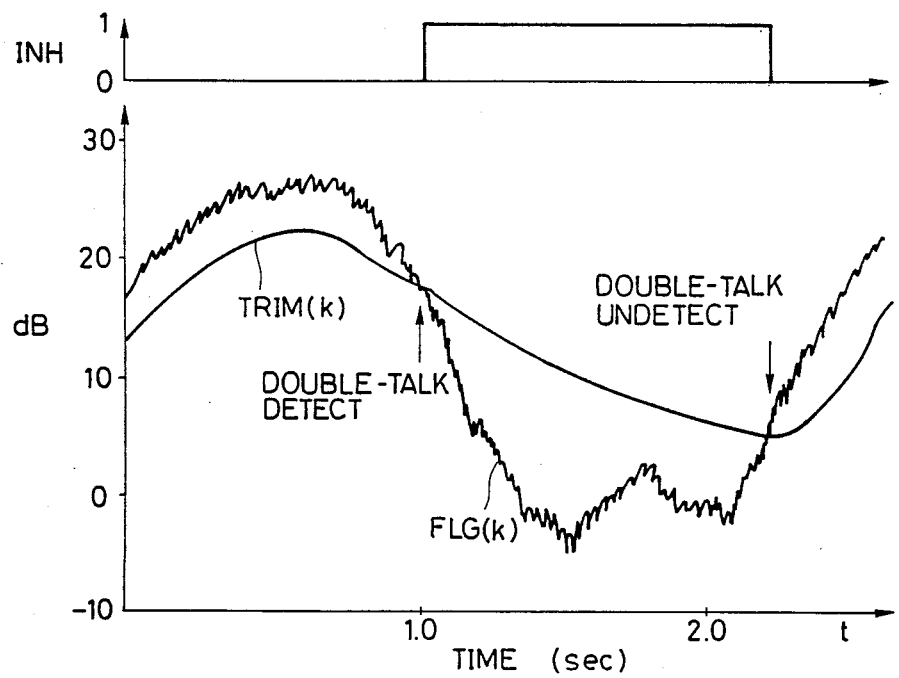
FIG. 7 illustrates signal waveforms occurring in FIG. 4 in the double-talk state.
Figure 8:
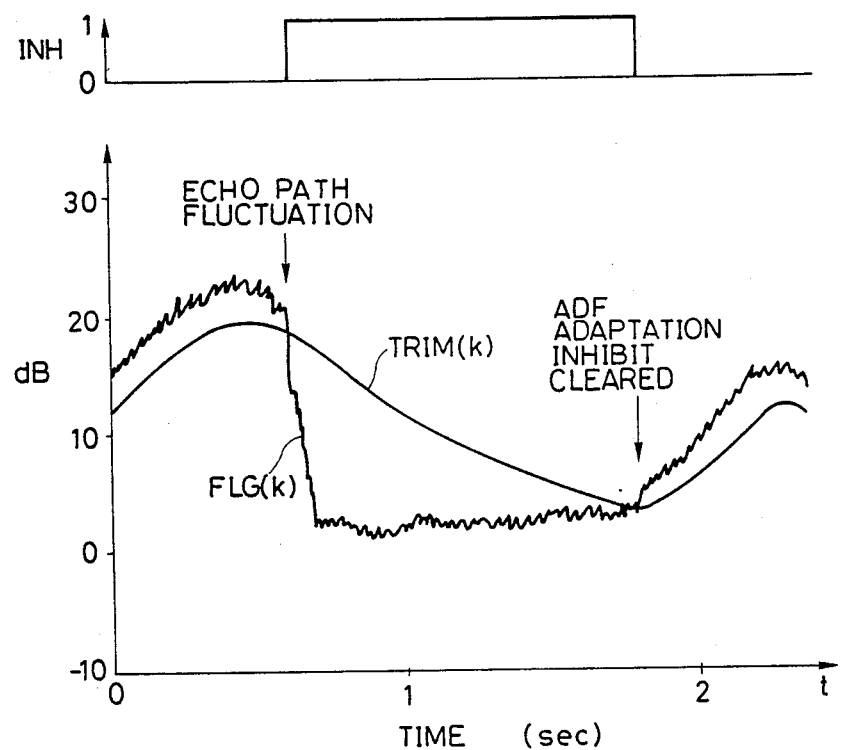
FIG. 8 illustrates signal waveforms occurring in FIG. 4 when there is a fluctuation in the echo path.

The control procedure of the devices shown in FIG. 4 and FIG. 5 will be explained with reference to FIG. 6 which shows a signal plot in the single-talk state, FIG. 7 which shows a signal plot in the double-talk state, and FIG. 8 which shows a signal plot when fluctuations occur on the echo path. In FIG. 6 through FIG. 8 the horizontal axis represents time t in seconds, and the vertical axis represents signal level in decibels (dB).

First, when the received signal Rin(k), the residual signal Res(k), and the echo signal Sin(k) are supplied to their input terminals 20, 21, and 22, the power of the received signal Rin(k) is detected by the power detector 23 and converted to the signal Prin(k), which is then converted by the logarithmic converter 26 to the logarithm signal Lrin(k) and sent to the subtractor 29 and the comparator 32. Similarly, the residual signal Res(k) is converted by the power detector 24 to the signal Pres(k), which is converted by the logarithmic converter 27 to the signal Lres(k) and sent to the subtractor 29. The echo signal Sin(k) is converted by the power detector 25 to the signal Psin(k), which is converted by the logarithmic converter 28 to the signal Lsin(k) and sent to the comparator 33.

The subtractor 29 subtracts the output signal Lres(k) of the logarithmic converter 27 from the output signal Lrin(k) of the logarithmic converter 26 and supplies the difference Acoms(k) to the threshold control section 31 and the adder 30. The adder 30 adds a margin to the signal Acoms(k) and supplies the resulting sum signal FLG(k) to the threshold control section 31 and the comparator 34.

The comparators 32, 33, and 34 perform their comparisons in the order 32, 33, 34. First the comparator 32 compares the reference signal XTH with the signal Lrin(k). If Lrin(k)<XTH, the received signal Rin(k) is considered to be idle and the inhibit signal INH and control inhibit signal S32 outputs are set to "1". The "1" inhibit signal INH is applied through the inhibit clear circuit 35 and the output terminal 36 to the ADF 15 in FIG. 1, inhibiting the estimation function performed by the ADF 15. The control inhibit signal S32 inhibits updating of the double-talk detection threshold TRIM(k) by the threshold control section 31. In this case the other comparators 33 and 34 do not perform any comparison. If the comparator 32 determines that Lrin(k)≧XTH, however, the comparator 33 performs a comparison and if Lsin(k)<YTH, finds the echo signal Sin(k) to be idle and generates the clear signals CL1 and CL2. The former clear signal CL1 clears the inhibit signal INH at the output terminal 36 to, for example, zero and places the ADF 15 in the state in which the estimation function is enabled; the latter clear signal CL2 switches the select switch 70 in the threshold control section 31 to the terminal 70c and clears the threshold value TRIM(k) to, for example, zero. In this case the comparator 34 does not perform a comparison operation. If the comparator 33 determines that Lsin(k)≧YTH, however, the comparator 34 performs a comparison and generates a "1" output, denoting double-talk, for the inhibit signal INH if TRIM(k)≧FLG(k) or a "0" output, denoting single-talk, for the inhibit signal INH if TRIM(k)≦FLG(k). The "1" value of the inhibit signal INH passes through the inhibit clear circuit 35 and the output terminal 36 to the ADF 15 and inhibits the estimation function of the ADF 15. The result from the comparator 34 is applied to the threshold control section 31 in the form of the select signal S34, and switches the select switch 70 to the terminal 70a in the single-talk state, or to the terminal 70b in the double-talk state.

The threshold control section 31 in FIG. 5 uses two different signals Acoms(k) and FLG(k) to update the threshold value TRIM(k). The updated threshold value TRIM(k+1) is output via the selector switch 70.

In the single-talk state, the selector switch 70 is connected to the terminal 70a, selecting the threshold value TRIM(k+1) updated by the circuit 50. In the circuit 50, the multiplier 51 calculates the product Acoms(k)·δ1, the multiplier 54 calculates the product TRIM(k)·(1−δ1) of TRIM(k) from the unit delay element 53 and the coefficient (1−δ1), then the adder 52 calculates the threshold value TRIM(k+1)

$$\text{TRIM}(k) = \text{Acoms}(k) \cdot \delta 1 + \text{TRIM}(k+1) \cdot (1-\delta 1)$$

This result is output via the selector switch 70, the limiter 71, and the output terminal 42. With an appropriate choice of the coefficients δ1 and 1−δ1, the threshold value TRIM(k) traces the integral curve of the signal Acoms(k) as shown in FIG. 6. The signals FLG(k) and TRIM(k) stay near the margin value δ (db), satisfying FLG(k)>TRIM(k). The detection sensitivity therefore remains constant, and the ADF 15 is not unnecessarily inhibited from performing its estimation function.

In the double-talk state, the selector switch 70 is connected to the terminal 70b, and the circuit 60 selects the threshold value TRIM(k+1) updated by the signal FLG(k). In the circuit 60, the subtractor 61 subtracts the signal FLG(k) from the threshold value TRIM(k) output from the unit delay element 64 to generate the difference TRIM(k)−FLG(k). The multiplier 62 generates the product (TRIM(k)−FLG(k))·δ2, and the subtractor 63 calculates the threshold value TRIM(k+1):

$$TRIM(k+1) = TRIM(k) - (TRIM(k) - FLG(k)) \cdot \delta 2$$

This result is output via the selector switch 70, the limiter 71, and the output terminal 42. Thus the circuit 60 reduces the threshold value TRIM(k+1) by an amount proportional to the difference in level between the threshold value TRIM(k) and signal FLG(k). With an appropriate choice of the coefficient δ2, the threshold value TRIM(k) and the signal FLG(k) behave as in FIG. 7. As shown in FIG. 7, when double-talk occurs, the difference between the received signal level Lrin(k) and the transmitted signal level Lres(k) is quickly reduced, making TRIM(k)≧FLG(k), so the adaptive function of the ADF 15 is inhibited. At the end of the double-talk state, the signal FLG(k) increases so that TRIM(k)≦FLG(k) and the ADF 15 resumes its adaptive operation. The region in which the estimation of the ADF 15 is inhibited can be set by selection of the coefficient δ2, which adjusts the amount by which the threshold value TRIM(k) decreases.

If a rapid fluctuation occurs on the echo path C then as shown in FIG. 8 TRIM(k)≧FLG(k) becomes true and the estimation of the ADF 15 is inhibited, but the threshold value TRIM(k) decreases, so after a certain time TRIM(k)<FLG(k) and the ADF 15 resumes its estimation.

In the threshold control section 31 in FIG. 5, when the clear signal CL2 is received the selector switch 70 is connected to the terminal 70c, and the unit delay elements 53 and 64 and the output are cleared to, for example, zero. When the control inhibit signal S32 is received from the comparator 32, the threshold value TRIM(k) is held in the unit delay elements 53 and 64 without being updated, and that value of TRIM(k) is output without change.

The advantages of this embodiment are summarized as follows.

[1] Substantially the same advantages are obtained in this embodiment as in reference (3) cited earlier.

Specifically, the level of the received signal Rin(k), the residual signal Res(k), and the echo signal Sin(k) can be easily recognized because the power of these signals is detected and converted to the logarithmic domain. Double-talk detection sensitivity is high because it focuses on the level difference Acoms(k) between the received signal Rin(k) and the residual signal Res(k). If the estimation of the ADF 15 is inhibited because of double-talk or because of a fluctuation on the echo path, the threshold value TRIM(k) decreases with elapsing time, enabling the adaptive operation of the ADF 15 to resume.

[2] A margin value γ is provided so that minor fluctuations on the echo path C do not inhibit the estimation operation of the ADF 15.

[3] The threshold value TRIM(k) is calculated by the integrating circuit 50 for the signal Acoms(k), so the threshold value TRIM(k) is assured of following the movement of the signal Acoms(k) and the estimation of the ADF 15 is not inhibited unnecessarily.

[4] A comparator 33 is provided to detect noise in the echo signal Sin(k), so even when there is input of the received signal Rin(k), if there is no echo signal input Sin(k), a switchover, fixed delay, or infinite loss is determined to have occurred on the echo path C, the threshold value TRIM(k) is immediately decreased, and the estimation function of the ADF 15 is not inhibited.

Figure 9:
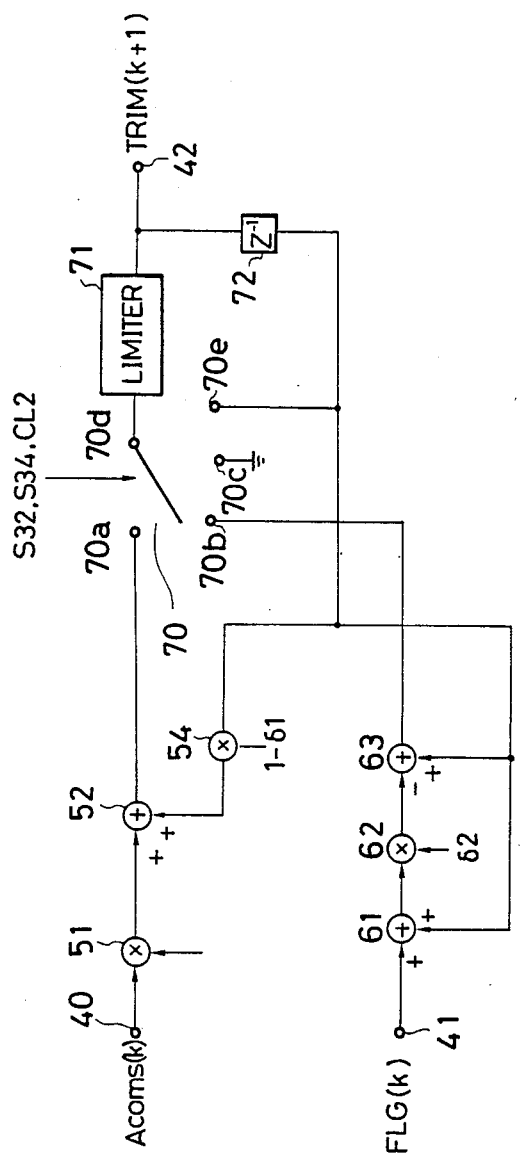
FIG. 9 is a block diagram showing a modification of threshold control section shown in FIG. 4.

FIG. 9 shows another example of threshold control section 31 shown in FIG. 4. It is similar to the example of threshold control section 31 shown in FIG. 5, but differs from it in that (1) the unit delay elements 53 and 64 are omitted and instead a common unit delay element 72 is provided, and its output is supplied to multiplier 54 in the circuit 50 and subtractors 61 and 63 in the circuit 60. The output of the unit delay element 72 is also connected to one terminal 70e of select switch 70. The select switch 70 selects the terminal 70e when the control inhibit signal S32 is high.

As described in detail above, the above embodiment provides a margin for the level difference between the received signal and the residual signal, so the estimation of the ADF is not inhibited due to minor fluctuations on the echo path. The threshold value is calculated by integrating the level difference between the received signal and the residual signal, so unnecessary inhibition of the estimation of the ADF is avoided. Silence of the echo signal is also detected and the threshold value is quickly reduced so that the estimation function of the ADF is not inhibited. Accordingly, double-talk detection can be controlled with stability and excellent detection sensitivity.

Figure 10:
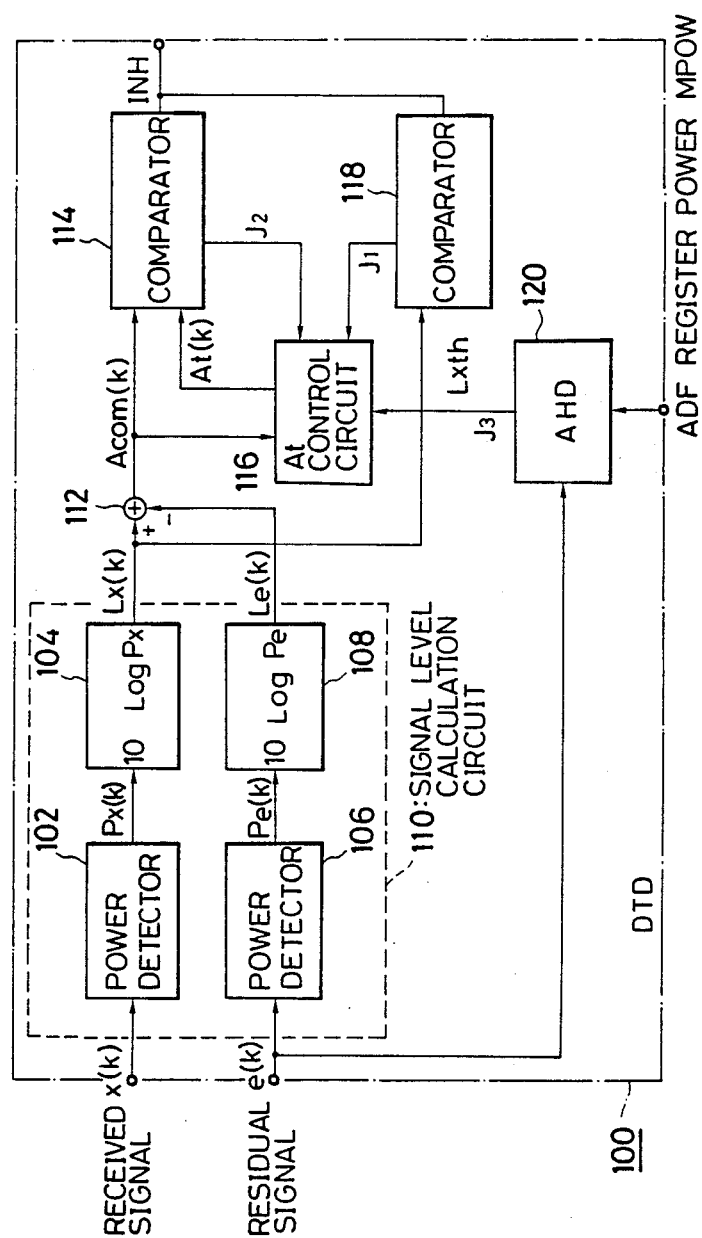
FIG. 10 is a block diagram of another embodiment of the present invention in a double-talk detector.

FIG. 10 is a block diagram showing a double-talk detector in accordance with another embodiment of this invention for use in an echo canceller.

In this embodiment, the double-talk detector 100 that controls the adaptive estimation function of the adaptive digital filter of the echo canceller comprises: a signal level calculation circuit 110 having a power detector 102 and logarithmic converter 104 for the input signal x(k) (Rin(k)) and a power detector 106 and logarithmic converter 108 for the residual signal e(k) (Res(k)). The signal level calculation circuit generates the respective signal levels Lx(k) and Le(k). The double-talk detector 100 further comprises a comparator 114, a double-talk detection threshold control circuit 116 (referred to as the At control circuit below) for setting double-talk detection threshold value At in the comparator 114; an idle detector 118; and a howling detector 120.

The power of the received signal Rin(k) and the residual signal Res(k) is detected by the corresponding power detectors 102 and 106, which generate power signals Px(k) and Pe(k) that are converted by the logarithmic converters 104 and 108 in the next stage to signal levels Lx(k) and Le(k) with values in the logarithmic domain. An adder 112 generates a level signal Acom $(k) = Lx(k) - Le(k)$, which is the difference between the two signal levels, and supplies it to the At control circuit 116 and to the comparator 114.

The comparator 114 compares the level signal Acom(k) with the threshold value At(k) calculated at the (k−1)− th sampling point by the At control circuit 116.

(1) If At(k)<Acom(k), the detection signal $J_2$ assumes a logic value, 0 for example, representing the single-talk state, and a 0 output is generated for the adaptive function inhibit signal INH to enable the adaptive function of the ADF.

(2) If At(k)<Acom(k), the detection signal $J_2$ assumes a different logic value, 1 for example, representing the double-talk state and an INH=1 output is generated to inhibit the adaptive function of the ADF.

The detection signal $J_2$ is applied to the At control circuit 116 shown in FIG. 10 as an At control selection signal.

The idle detector 118 in this embodiment comprises a comparator that compares the signal level Lx(k) of the received signal with a preset idle detection threshold value Lxth to detect the idle state of the received signal. If this idle detector 118 determines that Lxth>Lx(k), it generates an adaptive function inhibit signal INH=1 to prevent the estimation of the ADF from being disrupted, and sends a detection signal $J_1$ ($J_1$=1) to the At control circuit 116 as an At control selection signal. In the opposite case, when it determines that Lxth ≦Lx(k), the received signal is present, so the idle detector 118 clears INH to 0 and sets the detection signal $J_1$ to 0.

The adaptive howling detector 120 uses the residual signal e(k) and the received signal register power MPOW(k) from the ADF to detect howling and, when howling is detected, sends an At control selection signal $J_3$=1 to the At control circuit 116. The ADF's received signal register power MPOW(k) is a value calculated by the ADF in order to perform its adaptive estimation using the learning identification method, and is the sum (total power) of the power of the received signals Rin(k), Rin(k−1), ..., Rin(k−n) (where n is the order of the ADF) at a number of sampling points as stored in delay elements in the ADF.

Figure 11:
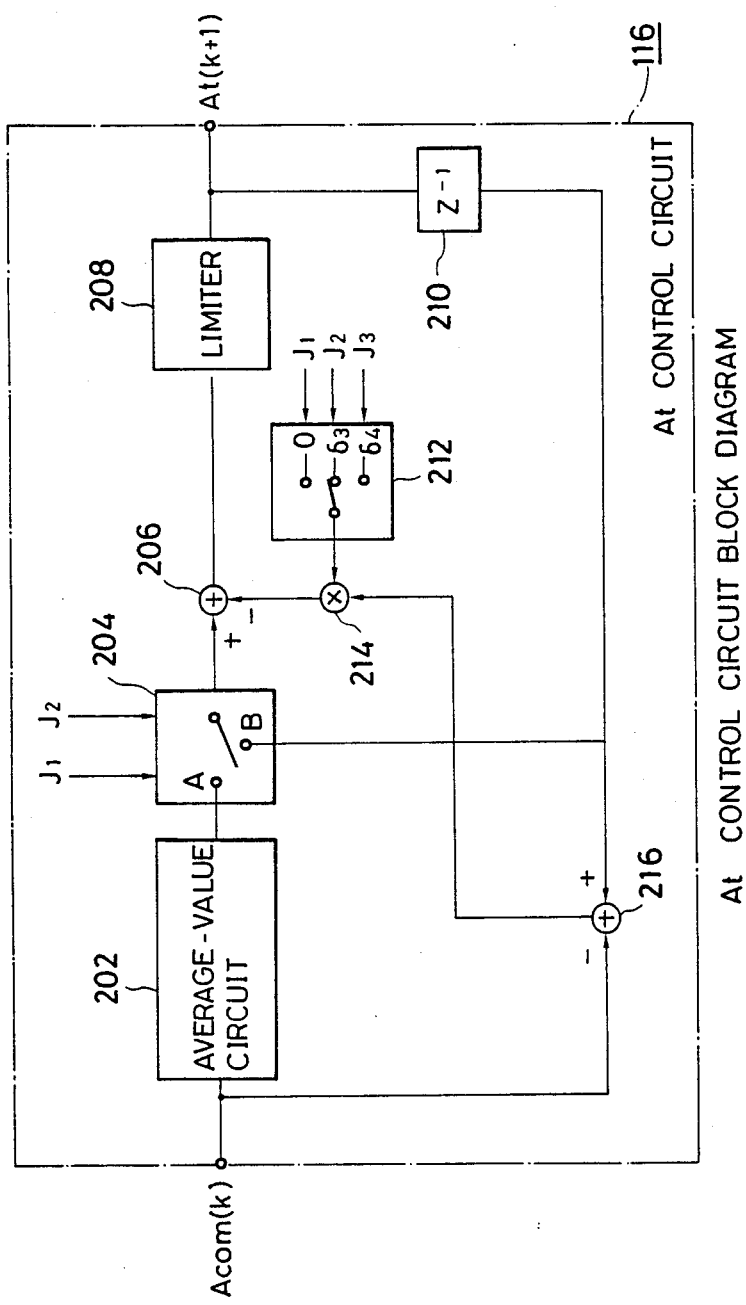
FIG. 11 is a block diagram of an example of the control circuit for the double-talk detection threshold provided in the double-talk detector in FIG. 10.

The At control circuit 116 updates, stores and subtracts the double-talk detection threshold value At(k) according to the detection result $J_2$ from the comparator 114, the detection result $J_1$ received from the idle detector 118 (FIG. 10) as the At control inhibit signal, and the detection result $J_3$ received from the adaptive howling detector (AHD) 120 to be described later. FIG. 11 is a block diagram of an example of a specific configuration of the At control circuit 116. This At control circuit 116 comprises an average-value circuit 202, a selector switch 204, and adder 206 for decreasing a threshold value to be described later, a limiter 208 that generates the threshold signal At(k+1) corresponding to the next sampling point, which is the output signal of the At control circuit 116, a unit delay element 210 for delaying this output by one sampling period, a selector switch 212 for selecting a constant 0, $\delta_3$, or $\delta_4$ (where $\delta_3$ and $\delta_4$ are mutually independent constants), a multiplier 214 for multiplying by the selected constant, and an adder 216 for obtaining the difference between the threshold value At(k) to be described later and the level difference signal Acom(k).

The level difference signal Acom(k) is supplied to the average-value circuit 202 and the adder 216. The average-value circuit 202 determines the average value of the signal Acom(k) over a long time consisting, for example, of 128 or 256 sampling periods according to a formula such as the following;

$$\frac{\sum_{i=0}^{127} A_{com}(k - i)}{128}$$

Next, after such processing as necessary to hold the double-talk detection sensitivity fixed with respect to the long-term average value, the value is sent to the selector switch 204.

This average value is sent to terminal A of the selector switch 204. Terminal B of the selector switch 204 is connected to the unit delay element 210. The selector switch 204 receives the detection result $J_1$ from the idle detector 118 and the detection result (control inhibit signal) $J_2$ output for double-talk detection from the comparator 114, and operates as indicated next in Table I according to the detection signals $J_1$ and $J_2$.

TABLE I

| $J_1$ | $J_2$ | Selected terminal |
|---|---|---|
| 0 | 0 | A |
| 0 | 1 | B |
| 1 | 0 | B |
| 1 | 1 | B |

As can be understood from Table I, this selector switch 204 is arranged so that in the non-idle, single-talk state it selects terminal A and outputs the long-term average value calculated by the average-value circuit 202, while in other states, namely in the idle state or when only the local party is speaking, terminal B is selected and the At control circuit 116 operates to hold or reduce the threshold value.

The adder 216 sends the difference between the signal Acom(k) and the output At(k) of the unit delay element 210 to the multiplier 214.

The multiplier 214 multiplies the difference signal At(k)−Acom(k) by the constant (0, $\delta_3$, or $\delta_4$) selected by the selector switch 212 and furnishes the result to the adder 206.

The adder 206 substracts the output of the multiplier 214 from the output of the selector switch 204 and sends the result to the limiter 208. The function of this limiter 208 is to limit the threshold value At(k) as necessary so that it will not be set too high or low. The output from this limiter 208 is sent as the updated threshold value At(k+1) to the unit delay element 210 and to the comparator 114 shown in FIG. 10.

The selector switch 212 selects one of the three constants 0, $\delta_3$, and $\delta_4$ (where $0 \leq \delta_3 < < \delta_4 \leq 1$) according to the detection results $J_1$, $J_2$, and $J_3$ described above and depending on the whether the threshold value At(k) is being held or reduced. Table II describes the function of the selector switch 212.

TABLE II

| $J_1$ | $J_2$ | $J_3$ | Value selected by selector switch 212 | At(k) control formula and sending/receiving status |
|---|---|---|---|---|
| 0 | 0 | 0 | 0 | Single-talk (distant party's signal only) At (k + 1) = value output by average-value circuit |
| 1 | 0 | 0 | 0 | Both parties idle, or only local party speaking At (k + 1) = At (k) |
| 0 | 1 | 0 | $\delta_3$ | Double-talk or fluctuation on echo path At (k + 1) = At (k) − $\delta_3$ (At (k) − Acom (k)) |
| 0 | 1 | 1 | $\delta_4$ | Howling due to rapid change on echo path At (k + 1) = At (k) − $\delta_4$(At (k) − Acom (k)) |

Note: $0 \leq \delta_3 < < \delta_4 < 1$

As can be understood from Table II, in the single-talk state, when $J_1=0$, $J_2=0$, and $J_3=0$, the selector switch 212 selects the constant 0 for multiplication with the difference signal $At(k)-Acom(k)$, giving the result 0, while the selector switch 204 selects the long-term average-value signal from the average-value circuit 202, and the output value $At(k+1)$ from the adder 206 is sent to the limiter 208.

In the idle state or when only the local party is speaking, when $J_1=1$, $J_2=0$, and $J_3=0$, the selector switch 204 is connected to terminal B and the selector switch 212 selects the constant 0, so the threshold value is held: $At(k+1)=At(k)$.

In the double-talk state or when there are fluctuations on the echo path, when $J_1=0$, $J_2=1$, and $J_3=0$, the selector switch 204 is connected to terminal B and the selector switch 212 selects the constant $\delta_3$, so the output from the multiplier 214 is $\delta_3(At(k)-Acom(k))$ and the value output from the adder 206 is:

$$At(k+1)=At(k)-\delta_3(At(k)-Acom(k))$$

The output value, which is the double-talk detection threshold $At(k+1)$ for the next sampling point $(k+1)$, is therefore gradually reduced in proportion to the difference between $Acom(k)$ and $At(k)$.

In the howling state caused by a rapid fluctuation on the echo path, when $J_1=0$, $J_2=1$, and $J_3=1$, the selector switch 204 is connected to terminal B and the selector switch 212 selects the constant $\delta_4$, so the threshold value $At(k+1)$ is reduced as in the double-talk state or when there are fluctuations on the echo path, but the constant $\delta_4$ employed in this case is much larger than $\delta_3$, so the threshold value $At(k+1)$ is reduced rapidly according to the formula:

$$At(k+1)=At(k)-\delta_4(At(k)-Acom(k))$$

As a result, $Acom(k)>At(k)$ is quickly attained, restoring the condition $$Lx(k)-At(k)>Le(k)$$

thus enabling the ADF to perform its adaptive function. That is, although $Acom(k)$ is reduced in the howling state and the adaptive function of the ADF is inhibited, this is immediately detected and the ADF speedily begins its adaptive function, stopping the howling. The result is that the double-talk detection sensitivity remains fixed, tracking of minor fluctuations on the echo path is improved, and high speech quality is maintained on the telephone circuit.

The (1, 1, 0), (1, 1, 1), and (1, 0, 1) states of $(J_1, J_2, J_3)$ are self-contradictory, so they are excluded from Table II. The (0, 0, 1) state is also excluded from Table II, as it indicates that the ADF is able to perform its adaptive function in the howling state.

The adaptive howling detector (AHD) 120 will be described next.

Figure 12:
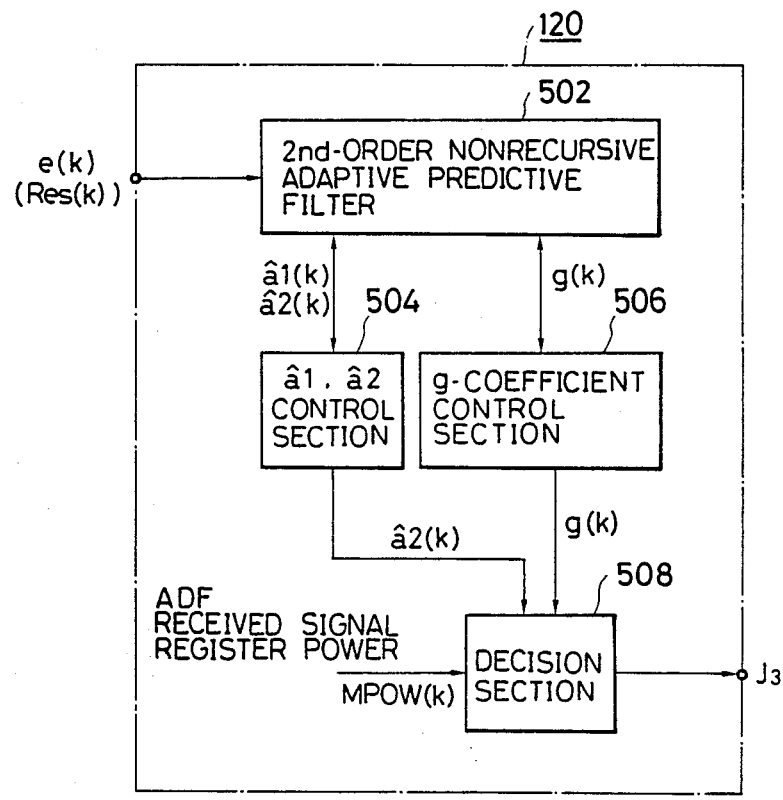
FIG. 12 is a block diagram of an example of the adaptive howling detector used in this invention.
Figure 13:
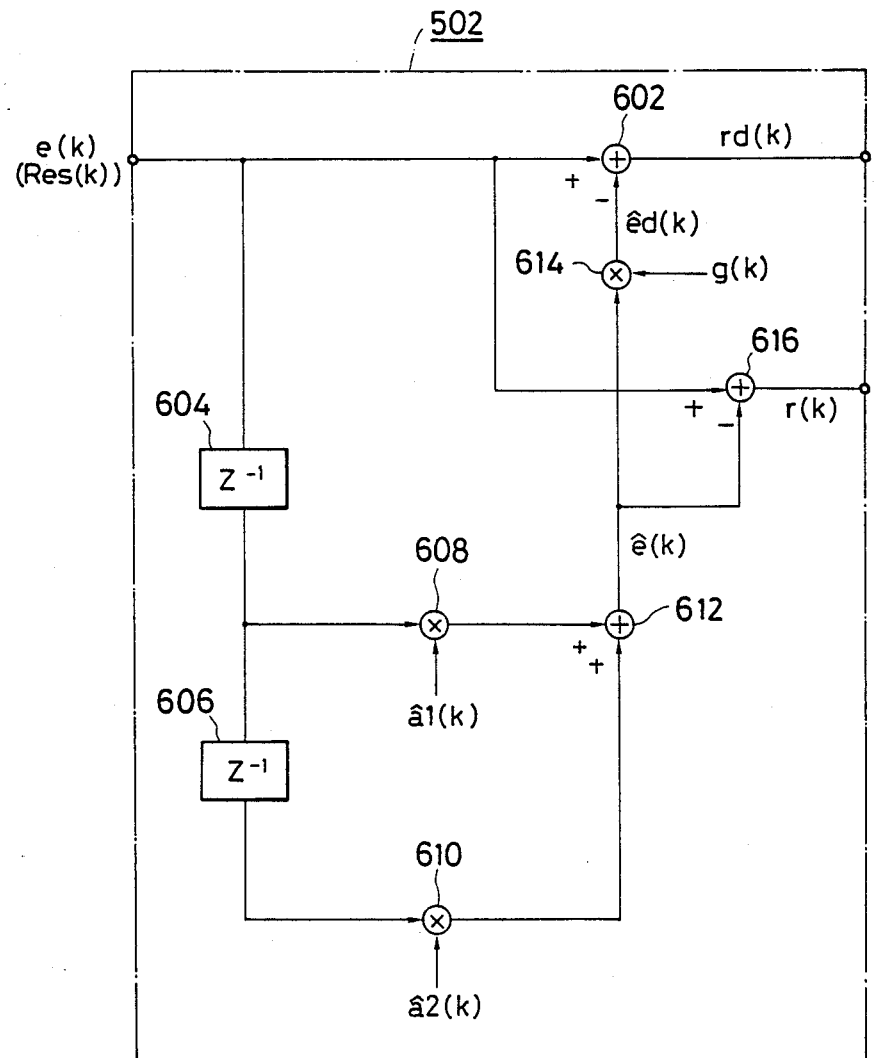
FIG. 13 is a schematic diagram of an example of a second-order FIR provided in the adaptive howling detector shown in FIG. 12.

FIG. 12 is a block diagram of an example of the adaptive howling detector 120. FIG. 13 is a schematic diagram of one of its components: a second-order non-recursive adaptive predictive filter (referred to below as a second-order FIR).

This howling detector 120 comprises a second-order FIR 502 for receiving the residual signal $e(k)$ ($Res(k)$), an $\hat{a}1(k)$, $\hat{a}2(k)$ control section 504 for controlling the coefficients input to the second-order FIR 502, a g-coefficient control section 506 for controlling the predictive output control coefficient $g(k)$ of the adaptive predictive filter, and a decision section 508 for detecting howling from $g(k)$, $\hat{a}2(k)$, and the ADF received signal register power $MPOW(k)$. These components are configured so that when howling is detected, the detection signal $J_3$ is set to a particular logic value, "1" for example, and sent to the At control circuit 116, while at other times the detection signal $J_3$ is set to the other logic value, "0" for example, and sent to the At control circuit 116.

The howling detection principle will be described next.

Let $x(k)$, $e(k)$, and $y(k)$ represent the values, when howling occurs, of the input/output signals $Rin(k)$, $Res(k)$, and $Sin(k)$, respectively, of the echo canceller 800. The signals $x(k)$, $e(k)$, and $y(k)$ are substantially pure sine waves with line-type spectra. If these sine waves are considered as the impulse response of a second-order recursive filter (which will be referred to as a second-order IIR) having the transfer function:

$$P(Z) = 1/(1 - A(Z)) \quad (201)$$

$$A(Z) = \sum_{i=1}^{2} a_i Z^{-1} \quad (202)$$

then these sine waves can be sequentially, adaptively predicted and made uncorrelated by input to a second-order FIR having the transfer function:

$$Q(Z) = 1 - \hat{A}(Z) \quad (203)$$

$$A(Z) = \sum_{i=1}^{2} a_i Z^{-1} \quad (204)$$

The FIR circuit in FIG. 13 comprises an adder 602 for receiving the residual signal $e(k)$ and generating from it and the dummy predicted value $\hat{e}d(k)$ a dummy residual signal $rd(k)$, a unit delay element 604 for delaying the signal $e(k)$ by the unit sampling period, a unit delay element 606 for further delaying the delayed signal $e(k)$, a multiplier 608 for multiplying the signal $e(k-1)$ from the unit delay element 604 by the coefficient $\hat{a}1(k)$, a multiplier 610 for multiplying the signal $e(k-1)$ from the unit delay element 604 by the coefficient $\hat{a}2(k)$, an adder 612 for adding the outputs from the multipliers 608 and 610 to generate a predicted value $\hat{e}(k)$, a multiplier 614 for multiplying this predicted value $\hat{e}(k)$ by a coefficient $g(k)$ to generate the dummy predicted value $\hat{e}d(k)$, and an adder 616 for subtracting the predicted value $\hat{e}(k)$ from the residual signal $e(k)$ to generate the residual signal $r(k)$. The resulting residual signal $r(k)$ and the dummy residual signal $rd(k)$ are both sent to the $\hat{a}1(k)$, $\hat{a}2(k)$ control section 504 and the g-coefficient control section 506 in FIG. 12.

Next will be described the algorithm by which the configuration shown in FIG. 13 adaptively generates a predicted value $e(k)$ and makes the residual signal $r(k)$ uncorrelated regardless of the frequency at which howling occurs.

The differential term given in differentiation of $r^2(k)$ by the predictive filter coefficient $\hat{a}_i(k)$ is:

$$r(k)=e(k)-\hat{e}(k) \quad (205)$$

$$\frac{\partial r^2(k)}{\partial \hat{a}_1(k)} = \frac{\partial}{\partial \hat{a}_1(k)} \{e(k) - \hat{e}(k)\}^2 \quad (206)$$
$$= -2 \cdot r(k) \cdot \frac{\partial}{\partial \hat{a}_1(k)} \cdot \hat{e}(k)$$
$$= -2 \cdot r(k) \cdot e(k-i)$$

The updating formula is accordingly:

$$\hat{a}_1(k+1) = \hat{a}_1(k) + \alpha \cdot r(k) \cdot \frac{e(k-i)}{\sum_{i=1}^{2} e^2(k-i)} \quad (207)$$

or $$a_i(k+1) = a_i(k) + \delta \cdot sgn\{r(k)\} \cdot sgn\{e(k-i)\} \quad (208)$$

where $0 < \alpha < 2$ and $\delta$ is a small positive value It follows that when $A(Z) = \hat{A}(Z)$ the input $e(k)$ is equal to the predicted value $\hat{e}(k)$ and the residual signal $r(k)$ is uncorrelated.

If the object is only to predict the sine wave and make $r(k)$ uncorrelated, it is possible to use:

$$\hat{a}2(k) = 1 \quad (209)$$

The root P of $1 - A(Z) = 0$ on the Z-plane can be expressed in polar coordinates as follows:

$$P = r \cdot e^{\pm j\omega} \quad (210)$$

where,
 r: modulus of the complex number P
 $\omega$: arguement of the complex number P
 e: base of the natural logarithms
Substitution into $1 - A(Z) = 0$ gives:

$$1 - A(z) = 0$$

$$(1 - re^{j\omega}Z^{-1}) \cdot (1 - re^{-j\omega}Z^{-1}) = 0$$

$$1 - 2r \cdot \cos\omega \cdot Z^{-1} + r^2 Z^{-2} = 0 \quad (211)$$

$$\begin{cases} a_1 = -2r \cdot \cos\omega \\ a_2 = r^2 \end{cases}$$

The impulse response of the second-order IIR is a sine wave only when $r^2 = 1$.

The $\hat{a}1(k)$, $\hat{a}2(k)$ control section 504 controls the coefficients $\hat{a}1(k)$ and $\hat{a}2(k)$ according to equations (207), (208), and (209) given earlier.

Next the predictive output control coefficient $g(k)$ is introducted as a means of expressing the degree of closeness of the signal to a sine wave. The algorithm for adaptively changing the coefficient $g(k)$ to make the dummy residual signal $rd(k)$ uncorrelated is given as explained below:

$$rd(k) = e(k) - \hat{e}d(k) \quad (212)$$

$$\frac{\partial rd^2(k)}{\partial g(k)} = \frac{\partial}{\partial g(k)} \cdot \{e(k) - \hat{e}_d(k)\}^2 \quad (213)$$
$$= -2r_d(k) \cdot \frac{\partial}{\partial g(k)} \cdot \hat{e}_d(k)$$
$$= -2r_d(k) \cdot \hat{e}(k)$$

Hence $$g(k+1) = g(k) + \alpha \cdot r_d(k) \cdot \frac{\hat{e}(k)}{\hat{e}(k)^2} \quad (214)$$

Alternatively, $$g(k+1) = g(k) + \delta \cdot sgn\{rd(k)\} \cdot sgn\{\hat{e}(k)\} \quad (215)$$

(where $0 < \alpha < 2$ and $\delta$ is a small positive value)

$$0 \leq g(k) < 1 \quad (216)$$

The g(k)-control section 506 controls g(k) according to equations (214), (215), and (216).

Due to the two controls described above, when e(k) is uncorrelated, $g(k) \approx 0$ and the predicted value $\hat{e}d(k) = 0$. If the input signal e(k) is similar to a sine wave (the howling state), then:
 Coefficient $g(k) \approx 1$
 $\hat{a}2(k) = 1$
 $e(k) \approx \hat{e}(k) = \hat{e}d(k)$
so the dummy residual signal rd(k) and r(k) are uncorrelated.

If howling were detected only through these two coefficients, howling might be detected falsely due to the local party's signal. False detection can be eliminated by using the fact that during howling the receiving and transmitting signal levels are high, observing the total power MPOW(k) of the ADF input signal register calculated for the adaptive function of the ADF, and detecting howling only when inequalities (217) through (219) are all true:

$$MPow(k) > MPth \quad (217)$$

$$g(k) > gth \quad (218)$$

$$a_2(k) > a2th \quad (219)$$

MPth: Power threshold for MPow(k)
 gth: Threshold for g(k) a2th: Threshold for a2(k)
When $a2(k) = 1$ as in equation (209) it is of course possible to dispense with equation (219).

The configuration of the adaptive howling detector 120 described above is only an example. No restrictions are placed on the configuration of the howling detector 120 in the embodiment described above as long as it is capable of generating a howling detection signal $J_3$. The configuration of the howling detector in the example above was arranged to receive the residual signal Res(k), designated e(k), but a similar effect could be attained through processing performed on input of the received signal Rin(k) (x(k)) or the echo signal Sin(k) (y(k)) instead of e(k).

Although in the embodiment above the adaptive howling detector and the idle detector were incorporated into the double-talk detector, they could also be provided externally to the double-talk detector and used in combination with the double-talk detector.

In the embodiment described above with reference to FIG. 10 to FIG. 13, the signal Acom(k) is applied to the subtractor 216 of the At control circuit 116 and to the comparator 114. But instead a signal FLG(k) obtained by adding a margin δ to the signal ACOM(k), in a manner shown in FIG. 4, may be substituted.

As is clear from the preceding description, in a double-talk detection method and apparatus according to the above embodiment.

(1) The double-talk detection threshold is lowered much faster when howling is detected then in the normal double-talk state, so even if howling occurs due to rapid fluctuations on the echo path and the adaptive function of the ADF is inhibited, the threshold is quickly reduced, the adaptive function of the ADF is promptly enabled, and the howling stops. Speech quality on the telephone circuit can thus be maintained at a high level without degradation.

(2) Furthermore, in apparatus according to the above embodiment the howling detector is configured using a simple second-order nonrecursive adaptive predictive filter, so employment of the additional detection parameters given in equations (217) through (219) enables howling to be detected with high accuracy.

Figure 14:
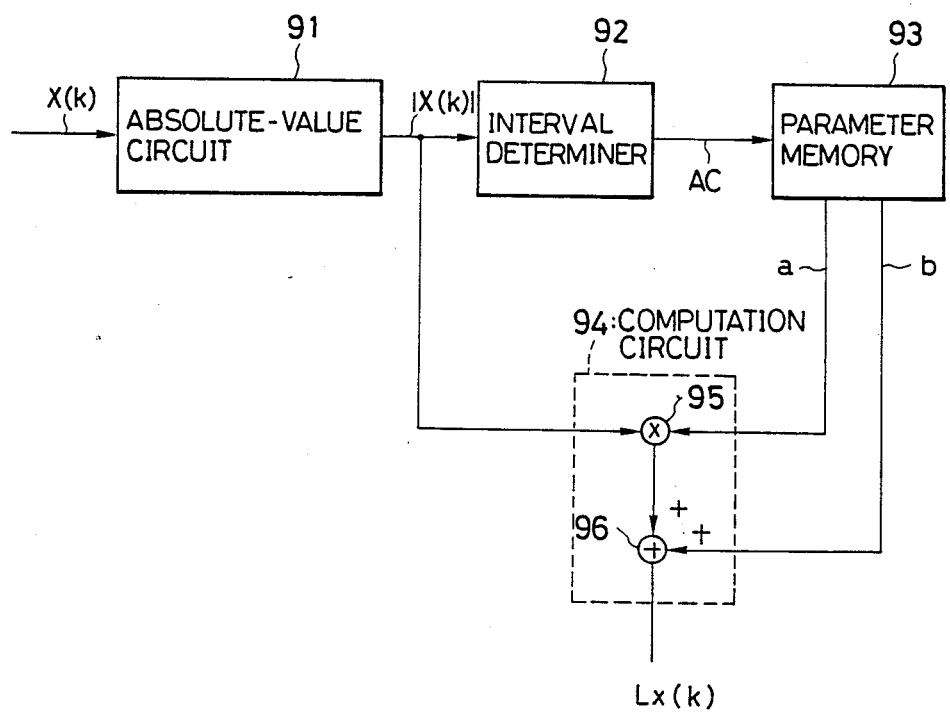
FIG. 14 is a block diagram of a logarithm calculator that can be used in the double-talk detectors according to this invention.

FIG. 14 is a block diagram of a logarithm calculator which may be used in the above embodiments of the double-talk detection apparatus.

This logarithm calculator comprises an absolute-value circuit 91 that determines the absolute value X(k) of, for example, a 16-bit digital input signal X(k) sampled at a time k. An interval determiner 92 is connected to the output side of the absolute-value circuit 91, and a parameter memory 93 is connected to the output side of the interval determiner 92. A computation circuit 94 is also connected to the output side of the absolute-value circuit 91 and the parameter memory 93.

The interval determiner 92 comprises shift registers, comparators, and other elements, in which a plurality of intervals are preset. The interval determiner 92 determines which of these intervals contains the absolute value $|X(k)|$, and outputs an access signal AC to the parameter memory 93 according to the determined result. The parameter memory 93 is a circuit that stores and outputs two parameters a and b corresponding to the intervals in the interval determiner 92, as indicated by the access signal AC. The computation circuit 94 comprises, for example, a multiplier 95 and an adder 96: the multiplier 95 multiplies the absolute value $|X(k)|$ by the parameter a; the result a $|X(k)|$ is added to the parameter b to calculate the logarithm value $L_X(k)$.

Figure 15:
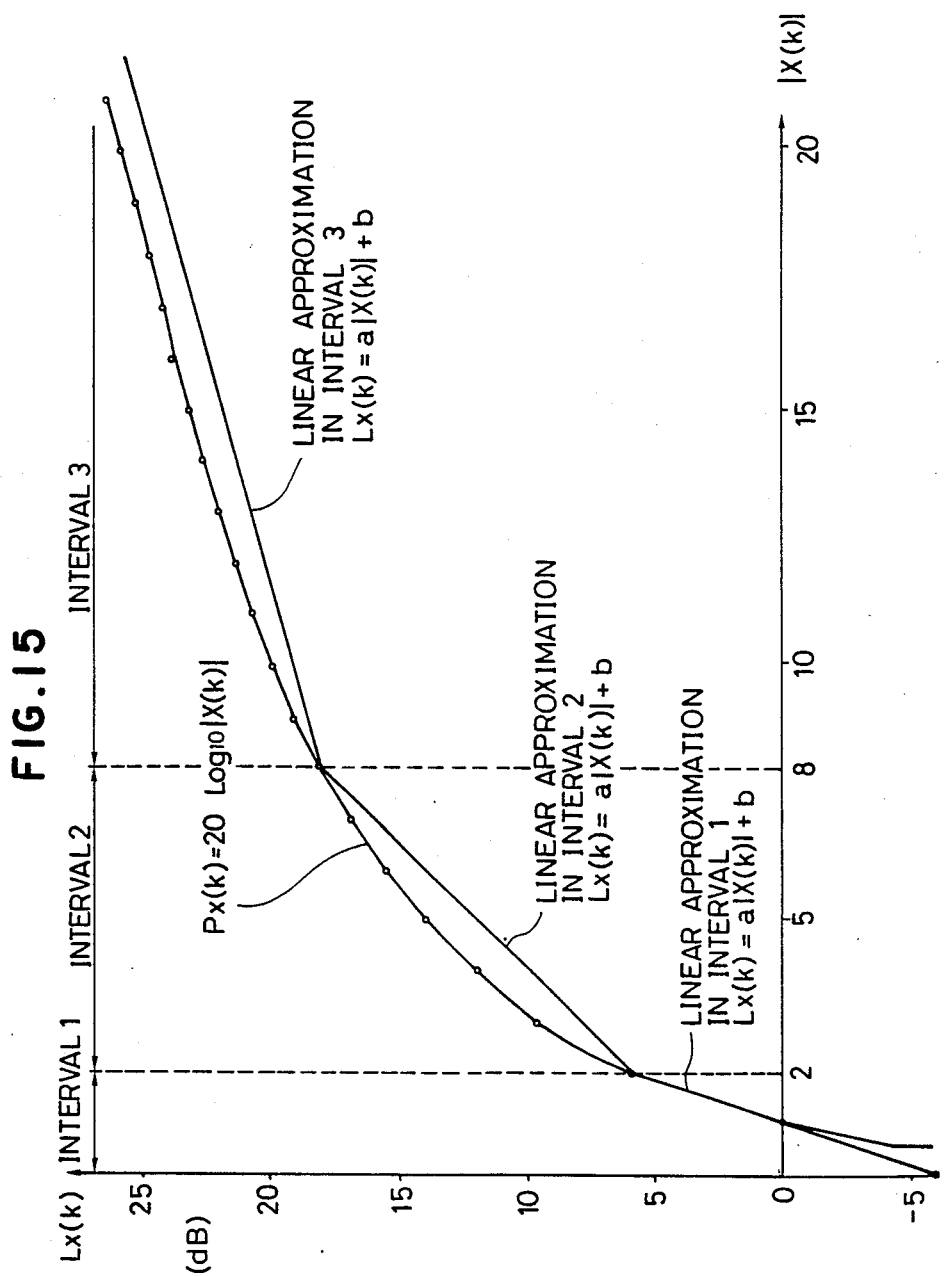
FIG. 15 illustrates the principle of operation of the logarithm calculator shown in FIG. 14.

FIG. 15 illustrates the principle of operation of FIG. 14. The horizontal axis in FIG. 15 indicates the absolute value $|X(k)|$ of the digital input signal X(k); the vertical axis indicates the corresponding logarithm value $L_X(k)$ expressed in decibels. The absolute value $|X(k)|$ of the 16-bit digital input signal X(k) is an integer in the range from 0 to 32767 which, when mapped onto the logarithmic domain by the function $P_X(k)$ $$P_X = 20 \log_{10}|X(k)|$$

produces the points on the curve in FIG. 15. An arbitrary point is assigned to the absolute value $|X(k)|=0$; in FIG. 15 this point is set at $-6$. The integers from 0 to 32767 are divided into a plurality of intervals numbered 1, 2, 3, ..., in each of which a linear function $L_X(k)$ of the form $$L_X(k) = a\ |X(k)| + b$$

(where a and b are parameters) provides an approximation to $P_X(k)$:

$$P_X(k) \doteq L_X(k)$$

In this way a linear function can be used to approximate the logarithm value corresponding to the absolute value $|X(k)|$ on a given set of intervals each having given parameters a and b.

FIG. 16 illustrates one possible choice of intervals and parameters a and b. In FIG. 16 the absolute value $|X(k)|$ of the digital input signal X(k) is divided into eight intervals up to $|X(k)|=32767$, the threshold values of each interval are powers of 2 (the threshold values of interval 1 being 0 and 2, the threshold values of interval 2 being 2 and 8, and so on), and for each interval the parameter a is a power of 2. Intervals 1 through 8 in FIG. 16 are preset in the interval determiner 92 in FIG. 14, and the parameter a and b data are stored in the parameter memory 93.

Suppose, for example, that the value of the digital input signal X(k) is $+9$. The absolute-value circuit 91 obtains the absolute value $|X(k)|=9$, which it sends to the interval determiner 92 and the multiplier 95, in the computation circuit 94. The interval determiner 92 determines that the absolute value $|X(k)|=9$ lies in interval 3 and generates a corresponding access signal AC which reads the parameters $a=2^{-1}$ and $b=14$ in the parameter memory 93, furnishes the parameter a to the multiplier 95, and furnishes the parameter b to the adder 96. The multiplier 95 performs the calculation:

$$a \cdot |X(k)| = 2^{-1} \cdot 9 = (\tfrac{1}{2}) \cdot 9 = 4.5$$

and furnishes the result 4.5 to the adder 96. The adder 96 performs the calculation:

$$a \cdot |X(k)| + b = 4.5 + 14 = 18.5$$

This gives the logarithm value $L_X(k)=18.5$.

The above example of logarithm calculator provides the following advantages:

(1) The logartithm value $L_X(k)$ of a digital input signal X(k) can be calculated with good accuracy by a simple circuit configuration comprising an absolute-value circuit 91, an interval determiner 92, a parameter memory 93, and a computation circuit 94. In particular, the accuracy of the approximation can be improved by more finely dividing the intervals.

(2) The capacity of the parameter memory 93 need not exceed 50 words, much less than the 32768 words that the prior art would require for a 16-bit digital input signal X(k).

(3) The intervals can be set in a way that greatly simplifies the interval determination and the calculations.

Specifically, if the interval range is divided into eight intervals as in FIG. 16 and the threshold absolute values $|X(k)|$ of the intervals are expressed as powers of 2, the interval determiner 92 can easily be implemented using, for example, a shift register and comparator. Since the parameter a in FIG. 13 is also expressed as a power of 2, a shift register, for example, can be used instead of the multiplier 95 in the computation circuit 94, thus simplifying the calculation process.

The above logarithm calculator can be modified in various ways. An example of such a modification is the following:

In interval 1 in FIG. 16 the only possible absolute values |X(k)| are 0 and 1, so instead of performing operations with the multiplier 95 and the adder 96, it is possible to store the logarithm values $L_X(k)$ corresponding to the absolute values 0 and 1 in the parameter memory 93 and read the stored logarithm values $L_X(k)$ directly from the parameter memory 93 when the digital input signal X(k) is received.

As detailed above, the above logarithm calculator enables logarithm values to be calculated with good accuracy by a simple circuit configuration including a small parameter memory, in which an absolute-value circuit obtains the absolute value of a digital input signal, an interval determiner determines the interval in which the absolute value lies, parameters are read from a parameter memory according to the determined interval, and a computation circuit calculates the logarithm value from these parameters and the absolute value.

What is claimed is:

1. A method of double-talk detection in an echo canceller that uses an adaptive digital filter to adaptively estimate, from a received signal and a transmitted signal to which an echo signal of the received signal is added, the characteristics of an echo path and generate an echo replica signal, and substracts this echo replica signal from the transmitted signal in order to transmit a residual signal from which the echo signal has been removed, and which during the course of this operation detects a double-talk state according to a double-talk detection threshold and inhibits the adaptive estimation by the adaptive digital filter, wherein:
   a determination is made as to whether the received signal is active or idle and, if it is idle, the adaptive estimation by the adaptive digital filter is inhibited and the double-talk detection threshold is held constant;
   if the received signal is active, a determination is made as to whether the echo signal is active or idle, and if the echo signal is idle, the inhibition of the adaptive estimation by the adaptive digital filter is cleared and the double-talk detection threshold is rapidly reduced;
   if the received signal is active and the echo signal is active, the levels of the received signal and residual signal are determined, a margin is added to the difference between them, the result is compared with the double-talk detection threshold, and if the former is less than the latter, the double-talk state is detected and the adaptive estimation by the adaptive digital filter is inhibited, whereas if the former is greater than the latter, the single-talk state is detected and the inhibition of the adaptive estimation by the adaptive digital filter is cleared; and
   the double-talk detection threshold is updated while the adaptive digital filter is estimating, in accordance with integration of its past values, the received signal, and the residual signal.

2. A double-talk detection method for control of adaptive estimation by an adaptive digital filter in an echo canceller, the filter having a double-talk state and a single-talk state determined on a basis of comparison of a function of a received signal, and a residual signal obtained from a transmittal signal from which a replica of an echo signal has been substracted, to a double-talk detection threshold, wherein the double-talk detection threshold is controlled so that:
   (i) in the single-talk state, the long-term average value of the level difference between the received signal and the residual signal is used for double-talk detection;
   (ii) in a double-talk state, or when there are fluctuations on an echo path but these are not so great as to cause howling, or when the received signal is idle, the detection threshold is held or is reduced at a gradual rate;
   (iii) when howling is detected, the detection threshold is reduced faster than the gradual rate.

3. A double-talk detector for the control of the adaptive estimation of an adaptive digital filter in an echo canceller, comprising:
   a signal level calculation circuit for calculating the signal level of a received signal and a residual signal;
   a comparator for comparing a signal indicative of a difference in level between said received signal and said residual signal with a double-talk detection threshold and generating an adaptive estimation inhibit signal;
   a howling detector for detecting howling;
   an idle detector for detecting the idle state of said received signal; and
   a double-talk detection threshold control circuit for receiving said level difference signal and controlling the double-talk detection threshold in response to the detection results from the idle detector, the comparator, and the howling detector so that the detection threshold is reduced more rapidly when howling occurs than in the double-talk state.

4. A double-talk detector for the control of the adaptive estimation of an adaptive digital filter, which has delay elements which store successive stored samples of a received signal in an echo canceller, comprising:
   a signal level calculation circuit for calculating the signal level of the received signal and a residual signal;
   a comparator for comparing a signal indicative of a difference in level between said received signal and said residual signal with a double-talk detection threshold and generating an adaptive estimation inhibit signal;
   a howling detector for detecting howling, wherein the howling detector comprises a second-order nonrecursive adaptive predictive filter for receiving the received signal, an echo signal, or the residual signal, and which detects howling by means of the second-order coefficient of said adaptive predictive filter, a predictive output control coefficient, and a received signal register power of the adaptive digital filter consisting of the sum of the power of the samples of the received signal stored in the delay elements, for output of an echo replica;
   an idle detector for detecting the idle state of said received signal; and
   a double-talk detection threshold control circuit for receiving said level difference signal and controlling the double-talk detection threshold in response to the detection results from the idle detector, the comparator, and the howling detector so that the detection threshold is reduced more rapidly when howling occurs than in the double-talk state.

* * * * *